(12) United States Patent
Pumareda et al.

(10) Patent No.: US 9,879,714 B2
(45) Date of Patent: Jan. 30, 2018

(54) CONNECTING ROD

(71) Applicant: Mahle International GmbH, Stuttgart (DE)

(72) Inventors: Arnaud Pumareda, Fellbach (DE); Sebastian Hemetzberger, Ostfildern (DE)

(73) Assignee: Mahle International GmbH (DE)

( * ) Notice: Subject to any disclaimer, the term of this patent is extended or adjusted under 35 U.S.C. 154(b) by 282 days.

(21) Appl. No.: 14/630,634

(22) Filed: Feb. 24, 2015

(65) Prior Publication Data
US 2015/0247528 A1 Sep. 3, 2015

(30) Foreign Application Priority Data

Feb. 28, 2014 (DE) ........................ 10 2014 203 663

(51) Int. Cl.
*F16C 9/04* (2006.01)
*F16C 7/02* (2006.01)
(Continued)

(52) U.S. Cl.
CPC ............... *F16C 9/04* (2013.01); *F16C 7/02* (2013.01); *F16C 7/023* (2013.01); *F16C 17/026* (2013.01);
(Continued)

(58) Field of Classification Search
CPC ........................................................ F16C 9/04
See application file for complete search history.

(56) References Cited

U.S. PATENT DOCUMENTS 2,311,434 A * 2/1943 Dusevoir ............... F16C 9/04 285/405
2,729,521 A * 1/1956 Maybach ............... F16C 9/04 384/294

(Continued)

FOREIGN PATENT DOCUMENTS

DE 475197 C 4/1929
DE 2360078 A1 6/1975
(Continued)

OTHER PUBLICATIONS

European Search Report EP 15 15 5253, dated Oct. 12, 2015.
(Continued)

*Primary Examiner* — Terence Boes
(74) *Attorney, Agent, or Firm* — Fishman Stewart PLLC

(57) ABSTRACT

A connecting rod for a reciprocating piston machine may include a hollow-cylindrical connecting rod bushing for receiving a piston pin and a hollow-cylindrical connecting rod bearing having a bearing axis running parallel to a cylinder axis of the connecting rod bushing for mounting a crank pin. An elongated shaft may extend perpendicularly to the bearing axis and be disposed between the connecting rod bushing and the connecting rod bearing for connecting the connecting rod bushing to the connecting rod bearing. The connecting rod bearing may include a connecting rod saddle which is materially connected to the shaft and a connecting rod cap which is materially separated from the shaft. A connecting rod joint may connect the connecting rod saddle to the connecting rod cap. The connecting rod joint may define a Hirth serration between the connecting rod saddle and the connecting rod cap.

18 Claims, 1 Drawing Sheet

(51) Int. Cl.
*F16H 21/24* (2006.01)
*F16C 17/02* (2006.01)
*F16C 17/04* (2006.01)
*F16C 17/10* (2006.01)
*F16C 32/06* (2006.01)

(52) U.S. Cl.
CPC .......... *F16C 17/045* (2013.01); *F16C 17/107* (2013.01); *F16C 32/0614* (2013.01); *F16C 32/0622* (2013.01); *F16H 21/24* (2013.01); *F16C 2226/60* (2013.01); *F16C 2360/22* (2013.01); *Y10T 74/18208* (2015.01)

(56) References Cited

U.S. PATENT DOCUMENTS

| | | | | | |
|---|---|---|---|---|---|
| 3,411,378 | A | * | 11/1968 | Borgeaud | F16C 9/04 74/579 R |
| 4,198,879 | A | * | 4/1980 | Hornak | B23P 15/00 29/464 |
| 4,458,555 | A | * | 7/1984 | Holtzberg | B32B 5/26 123/197.3 |
| 4,688,446 | A | * | 8/1987 | Ishikawa | F16C 9/04 123/197.4 |
| 6,276,233 | B1 | * | 8/2001 | Bolyard, III | F16C 9/045 123/197.3 |
| 6,435,723 | B1 | * | 8/2002 | Wolf | B23H 9/00 29/898 |
| 2003/0131683 | A1 | * | 7/2003 | Glannone | F16C 7/023 74/579 R |
| 2004/0025626 | A1 | * | 2/2004 | Burns, Jr. | B23P 15/00 74/579 R |
| 2014/0053798 | A1 | * | 2/2014 | Krause | F16B 39/225 123/197.3 |

FOREIGN PATENT DOCUMENTS

| | | |
|---|---|---|
| DE | 3604254 A1 | 10/1986 |
| DE | 3744197 A1 | 7/1989 |
| DE | 102004026297 A1 | 9/2005 |
| FR | 828865 A | 6/1938 |
| GB | 299872 A | 9/1929 |

OTHER PUBLICATIONS

Bibliographic Data Sheet Indicating No Abstract Available for DE-475197C.
Bibliographic Data Sheet Indicating No Abstract Available for FR-828865A.
English abstract for DE-3744197.
English abstract for DE-102004026297.
English abstract for DE-3604254.

* cited by examiner

CONNECTING ROD

CROSS-REFERENCE TO RELATED APPLICATIONS

This application claims priority to German Patent Application No. 10 2014 203 663.1, filed Feb. 28, 2014, the contents of which are hereby incorporated by reference in their entirety.

TECHNICAL FIELD

The invention relates to a connecting rod and to a reciprocating piston machine, in particular an engine.

BACKGROUND

A fluid energy machine, in which pistons perform an oscillating axial movement in cylinders, is described as piston machine in engineering. The transmission of the mechanical work in piston machines of this type is typically performed by means of special pushrods, so-called connecting rods, which convert the linear movement of the piston into the rotary movement of a so-called crankshaft. Common materials for connecting rods according to the prior art comprise, in addition to the traditionally used cast iron, mainly micro-alloyed steels and sintered metals. For individual applications, for example in the sports engine sector, special heat-treatable steels or the particularly light titanium are alternatively employed.

So-called cracked connecting rods enjoy widespread distribution. Such a connecting rod is initially produced in one piece, then—depending on the base material used—provided with a fracture or laser notch and finally specifically broken into two parts. Both parts are screwed together during the connecting rod assembly and unambiguously fit together along their mutual fracture surfaces. The construction of connecting rods split in such a manner is explained by Greuter/Zima/Hoffmann in "Motorschäden", Vogel Buchverlag, ISBN 3-8343-3056-6, pages 203 f.

A laser-notched connecting rod is known for example from DE 10 2004 026 297 A1. On the connecting rod described there a bearing is provided, which has a splitting surface running through the bearing, which is formed by fracture-splitting the bearing, wherein the bearing in sections is provided with a splitting notch, which over its overall length consists of variations with respect to its angular orientation regarding the partition plane, wherein the notching sections corresponding to these versions run parallel to a section line of the splitting plane with the bearing surface.

Problematic in this case proves to be the exact reproducible positioning of the severed so-called connecting rod cap as part of the connecting rod assembly. In addition, the lateral forces that act on the connecting rod during the operation of the crank drive have to be transmitted. With respect to this setting of problems, the use of pins running perpendicularly to the connecting rod joint for the additional axial stabilisation of cracked or otherwise split connecting rods is known from the prior art.

SUMMARY

The invention is based on the object of creating a connecting rod which fulfils the described functions while omitting additional pins. The invention furthermore sets itself the objective of creating a corresponding reciprocating piston machine.

These objects are solved through a connecting rod with the features of the independent claims and a corresponding reciprocating piston machine.

Accordingly, the invention is based on the basic idea of replacing the usual fracture edge of so-called cracked connecting rods by an axially effective serration on the face side, which in mechanical engineering is known as face notch or Hirth serration. The use of such serration is known for example from DE 37 44 197 A1, where it is utilised for joining split crankshafts. The transfer of this technology according to the invention to connecting rod joints allows reliably fixing the connecting rod cap which statically and a really contacts the connecting rod saddle in its intended relative position for a split connecting rod, without the installation of additional connecting pins to secure the connecting rod joint being required. A positively-joined connection which is capable of absorbing even high rotational moments and loads in a small installation space nevertheless materialises.

Within the scope of production planning, this opens up a multitude of possible process options to the person skilled in the art in particular in the area of chip-removing cutting processes according to DIN 8589. Primarily possible is the chip-removing machining of the base material selected for the connecting rod by way of a suitable milling technique. For even further increased precision the precision working of the Hirth serration within the scope of a following profile grind is recommended.

In a preferred embodiment of the invention, the described Hirth serration in this case is designed in such a manner that it includes a central angle which is smaller than the full angle of 360°. This opens the design possibility of providing the connecting rod joint with an additional plane surface and plane-parallel mating surface, which via a suitable distance spatially separate serration and bearing surface of the connecting rod eye from one another.

Especially under practical production considerations a form version proves to be advantageous in which said central angle is selected in such a manner that two tooth flanks of the Hirth serration adjoining the planar (mating) surface lie in a common space plane. Accordingly, the corresponding surface is more easily produced jointly with the adjoining tooth flank.

A simplification which is always aspired to since it is accompanied by a potential lowering of the unit costs may also materialise in that a central angle corresponding to the half angle of 180° is selected.

Another advantage is meanwhile offered by a configuration of the connecting rod in which the tooth head increases radially from the inside to the outside and the tooth base of the Hirth serration decreases in the same direction. Compared with an alternative configuration with tooth heads and bases running at a right angle to the centre axis of the serration the proposed form version offers the advantage of a self-centring effect of the resulting connecting rod joint, which offsets minor relative deviations between connecting rod saddle and cap during the course of the connecting rod assembly.

If in the latter scenario the radial ascending angle of the tooth base and the corresponding radial descending angle of the tooth base have the same amount, a serration on the part of the connecting rod saddle and connecting rod cap that is substantially identical in form can be introduced so that both connecting partners of a connecting rod according to the invention can be produced in principle with identical tooling.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically

DETAILED DESCRIPTION

Figure 1:
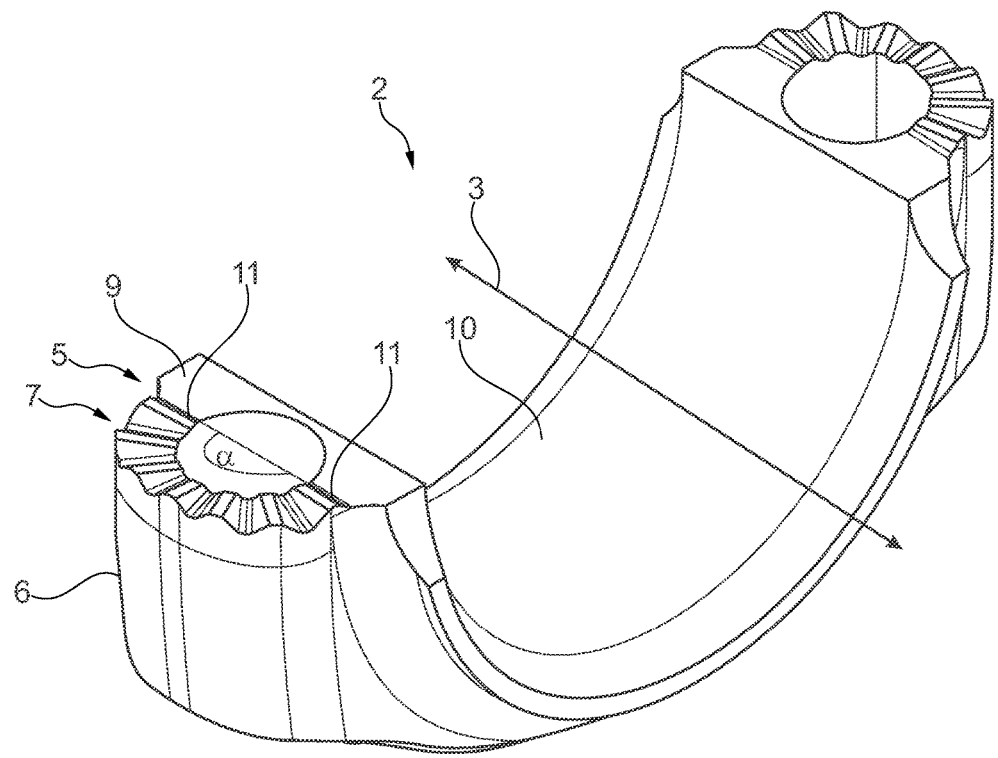
FIG. 1 the perspective part view of the connecting rod bearing of a connecting rod according to the invention and FIG. 2 the enlarged lateral view of the connecting rod in the region of the connecting rod joint.
Figure 2:
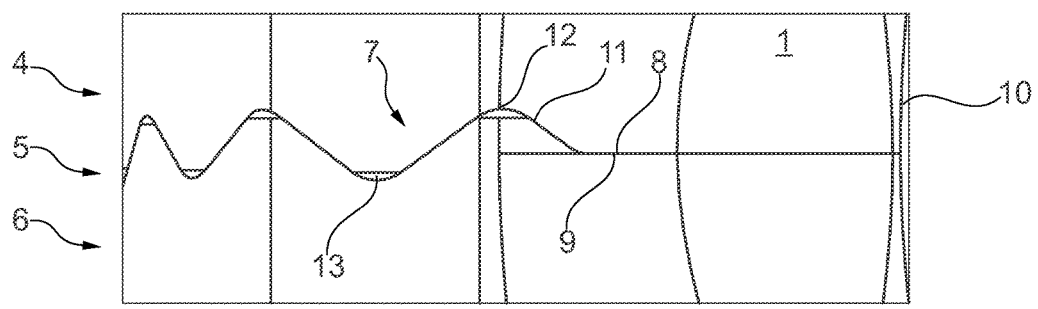

FIGS. 1 and 2 illustrate that construction of a connecting rod 1 according to an embodiment of the invention. Particular attention in this case is attached to the characteristic hollow-cylindrical connecting rod bearing 2 with its bearing axis 3 orientated parallel to the cylinder axis of a connecting rod bush which is not shown. FIG. 1 shows said connecting rod bearing 2 in the region of a connecting rod cap 6 which is materially separated from the remaining components of the connecting rod 1. The detailed lateral view of FIG. 2 by contrast illustrates how this connecting rod cap 6 via a connecting rod joint 5 is positively joined with a connecting rod saddle 4 formed complementarily to the connecting rod cap 6 into the total construction of the connecting rod bearing 2 according to the invention.

As is evident mainly from FIG. 1, the connecting rod joint 5 which is arranged on both sides of the bearing axis 3 splits into a plane surface 8 of the connecting rod saddle 4, which interacts with a mating surface 9 of the connecting rod cap 6 arranged in a plane-parallel manner, and the Hirth serration 7 which is substantial to the invention adjoining the surfaces 8, 9. In addition to the connecting rod joint 5 the connecting rod bearing 2 additionally comprises a bearing surface 10 symmetrically surrounding the bearing axis 3 within the connecting rod saddle 4 and of the connecting rod cap 6, into which each the surface 8 and the mating surface 9 lead at a right angle, for receiving the crank pin of a superordinate reciprocating piston machine mounted by means of the connecting rod bearing 2.

The specific arrangement of the Hirth serration 7 on the outside of the connecting rod joint 5 and the central angle α of merely 180° included by it result in that the surface 8 and the mating surface 9 spatially separate the bearing surface 10 from the Hirth serration 7. In addition it follows from the selection of the mentioned central angle α that, as is illustrated in particular by FIG. 1, two tooth flanks 11 of the Hirth serration 7 adjoining the mating surface 9 lie in a common space plane, which simplifies the production of the connecting rod 1.

The specific ascending and descending angles of the tooth head 12 and tooth base 13 designated in FIG. 2 are meanwhile only evident rudimentarily in FIG. 1. In this respect it must be emphasised that the tooth head 12 ascends towards the outside in radial direction of the Hirth serration 7 while the corresponding tooth base 13 descends towards the outside at a corresponding angle in exactly that direction.

The invention claimed is:

1. A connecting rod for a reciprocating piston machine, comprising:
   a hollow-cylindrical connecting rod bushing for receiving a piston pin,
   a hollow-cylindrical connecting rod bearing having a bearing axis running parallel to a cylinder axis of the connecting rod bushing for mounting a crank pin, and
   an elongated shaft extending perpendicularly to the bearing axis disposed between the connecting rod bushing and the connecting rod bearing for connecting the connecting rod bushing to the connecting rod bearing,
   wherein the connecting rod bearing includes a connecting rod saddle which is materially connected to the shaft, a connecting rod cap which is materially separated from the shaft and a connecting rod joint connecting the connecting rod saddle to the connecting rod cap,
   wherein the connecting rod joint defines a Hirth serration between the connecting rod saddle and the connecting rod cap.

2. The connecting rod according to claim 1, wherein the connecting rod joint includes a plane surface defined by the connecting rod saddle and a mating surface defined by the connecting rod cap, the mating surface extending along a plane parallel to the plane surface.

3. The connecting rod according to claim 2, wherein the connecting rod bearing further includes a bearing surface which symmetrically surrounds the bearing axis within the connecting rod saddle and the connecting rod cap, wherein the plane surface and the mating surface extend into the bearing surface at a right angle.

4. The connecting rod according to claim 3, wherein the plane surface and the mating surface spatially separate the bearing surface from the Hirth serration.

5. The connecting rod according to claim 1, wherein the Hirth serration includes a central angle of less than 360°.

6. The connecting rod according to claim 5, wherein the Hirth serration further includes a plurality of tooth flanks, wherein the central angle is determined at least in part such that at least two tooth flanks adjoining at least one of a plane surface defined by the connecting rod saddle and a mating surface defined by the connecting rod cap lie in a common space plane.

7. The connecting rod according to claim 6, wherein the central angle amounts to 180°.

8. The connecting rod according to claim 6, wherein the Hirth serration includes a tooth head defined by a first angle radially ascending in a direction away from the central angle and a tooth base defined by a second angle radially descending in the direction away from the central angle.

9. The connecting rod according to claim 8, wherein the first angle and the second angle are equal.

10. A reciprocating piston machine, comprising:
    a reciprocating piston for performing an oscillating stroke movement,
    a cylinder at least partially enclosing the reciprocating piston for guiding the stroke movement,
    a crankshaft having a crank pin mechanically connected to the reciprocating piston for performing a rotary movement coupled to the stroke movement, and a connecting rod connecting the reciprocating piston and the crankshaft for coupling the reciprocating movement and the rotary movement, the connecting rod including:
a hollow-cylindrical connecting rod bushing for receiving a piston pin of the piston, the connecting rod bushing having a cylinder axis;
a hollow-cylindrical connecting rod bearing for mounting the crank pin of the crankshaft, the connecting rod bearing having a bearing axis running parallel to the cylinder axis of the connecting rod bushing; and
a shaft extending perpendicular to the bearing axis coupling the connecting rod bushing to the connecting rod bearing;
wherein the connecting rod bearing includes a connecting rod saddle materially coupled to the shaft, a connecting rod cap materially separated from the shaft and a connecting rod joint coupling the connecting rod saddle to the connecting rod cap, the connecting rod joint defining a Hirth serration extending about a central angle between the connecting rod saddle and the connecting rod cap;
wherein the connecting rod joint includes a plane surface defined by the connecting rod saddle and a mating surface defined by the connecting rod cap, the mating surface extending along a plane parallel to the plane surface; and
wherein the Hirth serration includes a central angle of less than 360°.

11. The machine according to claim 10, wherein the connecting rod bearing further includes a bearing surface extending circumferentially around the bearing axis, wherein the plane surface and the mating surface of the connecting rod joint extending perpendicularly into the bearing surface.

12. The machine according to claim 11, wherein the plane surface and the mating surface spatially separate the bearing surface from the Hirth serration.

13. The machine according to claim 10, wherein the Hirth serration includes a plurality of tooth flanks, wherein at least two tooth flanks adjoining at least one of the plane surface and the mating surface lie on a common space plane.

14. The machine according to claim 13, wherein the central angle is approximately 180°.

15. The machine according to claim 10, wherein the Hirth serration includes a tooth head defined by a first angle ascending radially in a direction away from the central angle and a tooth base defined by a second angle descending radially in the direction away from the central angle.

16. The machine according to claim 15, wherein the first angle and the second angle are equal.

17. The connecting rod according to claim 1, wherein the Hirth serration extends about a central angle of approximately 180°.

18. A connecting rod for a reciprocating piston machine, comprising:
a hollow-cylindrical connecting rod bushing for receiving a piston pin, the connecting rod bushing having a cylinder axis;
a hollow-cylindrical connecting rod bearing defining a bearing surface for mounting a crank pin, the connecting rod bearing having a bearing axis running parallel to the cylinder axis of the connecting rod bushing, wherein the bearing surface extends circumferentially around the bearing axis; and
a shaft extending perpendicular to the bearing axis coupling the connecting rod bushing to the connecting rod bearing;
wherein the connecting rod bearing includes:
a connecting rod saddle materially connected to the shaft;
a connecting rod cap materially separated from the shaft;
a connecting rod joint coupling the connecting rod saddle to the connecting rod cap, the connecting rod joint defining a Hirth serration having a plurality of teeth extending circumferentially along a central angle between the connecting rod saddle and the connecting rod cap, the central angle being less than 360°, wherein the plurality of teeth of the Hirth serration includes at least one of (i) at least one tooth defining a first angle ascending radially in a direction away from the central angle and (ii) at least one other tooth defining a second angle descending radially in the direction away from the central angle;
wherein the connecting rod joint includes a plane surface defined by the connecting rod saddle and a mating surface defined by the connecting rod cap, the plane surface and the mating surface spatially separating the bearing surface from the Hirth serration.

* * * * *